(12) United States Patent
Bayer et al.

(10) Patent No.: US 10,627,267 B2
(45) Date of Patent: Apr. 21, 2020

(54) VARIABLE AREA FLOW METER WITH IMPROVED LINEARITY

(71) Applicant: ROTA YOKOGAWA GMBH & CO. KG, Wehr (DE)

(72) Inventors: Klaus Bayer, Bad Saeckingen (DE); Fabian Blum, Schopfheim (DE)

(73) Assignee: ROTA YOKOGAWA GMBH & CO. KG, Wehr (DE)

( * ) Notice: Subject to any disclaimer, the term of this patent is extended or adjusted under 35 U.S.C. 154(b) by 101 days.

(21) Appl. No.: 15/926,102

(22) Filed: Mar. 20, 2018

(65) Prior Publication Data

US 2019/0094053 A1  Mar. 28, 2019

(30) Foreign Application Priority Data

Jul. 28, 2017  (DE) .................. 10 2017 007 200

(51) Int. Cl.
  *G01F 1/24* (2006.01)
  *G01F 1/74* (2006.01)
  *H01F 7/02* (2006.01)

(52) U.S. Cl.
  CPC .................. *G01F 1/24* (2013.01); *G01F 1/74* (2013.01); *H01F 7/0294* (2013.01)

(58) Field of Classification Search
  CPC ...................................... G01F 1/24; G01F 1/74
  See application file for complete search history.

(56) References Cited

U.S. PATENT DOCUMENTS

| 4,059,015 A * | 11/1977 | Satori ..................... G01F 1/24 73/861.56 |
| 4,263,813 A * | 4/1981 | Gryn ....................... G01F 1/24 73/861.56 |
| 6,079,279 A | 6/2000 | Buessow et al. |
| 2009/0146651 A1 | 6/2009 | Hatanaka et al. |
| 2013/0055807 A1* | 3/2013 | Cochran ............... G01F 23/363 73/313 |

FOREIGN PATENT DOCUMENTS

| DE | 1773798 | 10/1971 |
| DE | 3304615 | 8/1984 |
| DE | 3505706 | 8/1986 |

* cited by examiner

*Primary Examiner* — Jewel V Dowtin
(74) *Attorney, Agent, or Firm* — Grossman, Tucker, Perreault & Pfleger, PLLC

(57) ABSTRACT

The invention relates to a variable-area flow meter with a measuring tube in which a float provided with at least one permanent magnet and movable by a fluid flowing through the measuring tube is arranged, and with an indicating device arranged outside the measuring tube, said indicating device comprising a magnet holder rotatably mounted about a rotation axis, said magnet holder holding at least one follower magnet that follows the movement of the permanent magnet, and having an indicating element which reflects the movement of the at least one follower magnet, wherein at least one follower magnet in the magnet holder is arranged in such a manner that its magnetic axis is inclined in relation to the rotation axis by an angle ($\alpha$) not equal to 90°.

14 Claims, 5 Drawing Sheets

VARIABLE AREA FLOW METER WITH IMPROVED LINEARITY

FIELD

The invention relates to a variable-area flow meter for determining the flow of a fluid through a measuring tube.

BACKGROUND

For the flow measurement, a floating element, provided with a permanent magnet and arranged inside the measuring tube, is lifted to a greater or lesser extent by the fluid flowing through the measuring tube. For the detection of the position of the floating element, at least one follower magnet is arranged outside the measuring tube in a magnet holder, which is mounted in a rotatable manner about a rotation axis. By means of this assembly, the upward and downward movement of the float inside the measuring tube is converted into a rotational movement that also depends on the flow volume of the fluid in the measuring tube. The movement of the at least one follower magnet or rotational movement caused by its movement is reflected and made apparent to the user by means of a mechanical or electronic indicating element. Such variable-area flow meters are described, for example, in DE 3304615 A1 and DE 3505706 A1.

One problem encountered in the transmission of the linear movement of the float to the indicating device is that the conversion into the rotational movement is not linear over the entire range of the float. Conventionally, when the linear lift of the float is plotted against the rotation angle about the rotation axis in the indicating device, S-shaped curves result (see FIG. 9). For example, if the rotational movement is to be illustrated with a pointer as the indicating element and the flow rate of the fluid is to be indicated on the basis of a corresponding scale, the non-linear conversion of the linear movement into the rotational movement will result in an irregular scale with a small spread. This complicates the reading of the measurement result. In principle, the same applies to an electronic indication of the measurement results since the measurement result to be indicated in this case is conventionally also determined on the basis of the rotation angle.

The indication of the measurement results is further disturbed by the influence of interfering magnetic fields, whether through the Earth's magnetic field or magnetic fields in the vicinity of the variable-area flow meter. These can lead to a situation in which the rotational movement is not exclusively determined by the interaction of the permanent magnet inside the float and the at least one follower magnet of the indicating device, but is instead distorted by external influences.

Accordingly, the invention aims to reduce and ideally completely avoid the problems described above and to achieve a conversion of the upward and downward movement of the float into a rotational movement in the indicating device that is as linear as possible. Moreover, magnetic disturbances should preferably be prevented as far as possible in order to avoid a falsification of the indicated measurement results.

SUMMARY

The object is achieved with the variable-area flow meter.

In its broadest sense, the invention thus relates to a variable-area flow meter with a measuring tube in which a float provided with at least one permanent magnet and movable by a fluid flowing through the measuring tube is arranged. An indicating device arranged outside the measuring tube comprises a magnet holder mounted in a rotatable fashion about a rotation axis, said magnet holder holding at least one follower magnet that follows the movement of the permanent magnet. An indicating element is provided in the indicating device for the indication of this movement. The at least one follower magnet is arranged in the magnet holder in such a way that its magnetic axis is inclined in relation to the rotation axis by an angle that is not 90°.

The inclination of the magnetic axis—i.e. the axis connecting the north and south poles of the follower magnet—with respect to the rotation axis of the magnet holder leads to an increased linearity in the conversion of the linear lifting movement of the float into the rotational movement of the magnet holder about the rotation axis. Preferably, and as known from the prior art, the rotation axis is oriented so as to be perpendicular to the direction of movement of the float inside the measuring tube. In the prior art, the follower magnet is usually oriented in such a way that its magnetic axis and the direction of movement of the float run parallel to one another, i.e. the magnetic axis of the follower magnet and the rotation axis form an angle of 90°. In the present invention, however, the magnetic axis of the follower magnet is inclined in relation to the rotation axis, i.e. has an orientation that is neither parallel nor perpendicular to the latter. This inclination of the magnetic axis relative to the rotation axis leads to an even conversion of the linear movement of the float into a rotational movement of the magnet holder about the rotation axis with a significantly increased linearity over the entire lifting range of the float. If the lifting of the float is plotted graphically against the corresponding rotation angle of the magnet holder, a curve with a significantly reduced curvature or a straight line (FIG. 9) results instead of the S-curves of the prior art. Accordingly, the lifting movement of the float can be converted into an even rotational movement, which can be indicated on an evenly scaled scale by means of the indicating element of the indicating device. A larger spread of the scale is also achieved compared to conventional indicating devices.

The angle at which the magnetic axis of the follower magnet needs to be arranged with respect to the rotation axis in order to achieve the best possible linearity in the conversion of the lifting movement into a rotational movement depends largely on the type of magnets used and on the distance between the permanent magnet of the float and the follower magnet. Where appropriate, a lateral offset between the permanent magnet and the follower magnet also needs to be taken into account. A suitable angle can be readily determined experimentally, e.g. by plotting the lift of the float against the corresponding rotation angle for different angles and ascertaining the result with the best linearity by trial and error. Research conducted by the inventors has shown that a good linearity can be achieved in particular when the angle is in a range from 5 to 70°, preferably 10 to 60°, more preferably 15 to 40° and especially 20 to 30°, wherein all ranges relate to an angle starting from the rotation axis and moving towards the measuring tube.

The polarity and orientation of the at least one follower magnet depends in a manner known per se on the arrangement of the permanent magnet inside the float. The latter is usually a bar magnet oriented parallel to the direction of movement of the float and polarized in its longitudinal direction. It is in principle possible in the context of the invention to arrange a single follower magnet in the magnet holder. It is, however, preferable to use two follower magnets. These are preferably configured as bar magnets. They are advantageously arranged in such a manner that one of them is located closer to the north pole of the permanent magnet of the float, while the other is located closer to the latter's south pole. The follower magnet located closer to the south pole is expediently oriented so that its north pole is oriented towards the measuring tube and thus towards the south pole of the permanent magnet. The second follower magnet is accordingly arranged with an inverted polarity towards the north pole of the permanent magnet.

In a preferred embodiment, two further magnets are arranged in the magnet holder in addition to the at least one follower magnet. These additional magnets serve to shield the assembly from interfering magnetic fields, which, as explained above, can lead to a distortion of the measurement results. In principle, it is also possible to use more than two additional magnets for shielding, although it is preferable to use pairs of magnets arranged with inverse polarities. Expediently, the further magnets, hereinafter referred to as shielding magnets, are also permanent magnets, in particular bar magnets. Like the follower magnets, the shielding magnets are arranged with their magnetic axis inclined in relation to the rotation axis, even if this is not necessarily required. In this regard, a symmetrical arrangement of all magnets around the rotation axis is particularly preferred. Thus, the magnetic axes of all magnets are particularly arranged in such a manner that they extend at the same angle in relation to the rotation axis, i.e. the magnetic axes lie on a conical surface the tip of which is located on the rotation axis. With regard to the angle of inclination, reference is made to the above discussion concerning the follower magnets. Preferably, the various magnets are all arranged at the same distance from the point of intersection of their magnetic axes.

The magnets are preferably arranged in the magnet holder in the circumferential direction around the rotation axis in such a manner that, in a top view in the direction of the rotation axis, the sequence "follower magnet-follower magnet-shielding magnet-shielding magnet" is obtained, the ends of the magnets have an alternating polarity, i.e. S-N-S-N or N-S-N-S. In principle, the arrangement of the follower magnets in relation to the permanent magnet of the float occurs in a manner known in the prior art, e.g. in such a manner that, when viewing the float along the rotation axis, the follower magnets are arranged with a slight lateral offset in relation to the permanent magnet.

The distance of all magnets from the rotation axis is preferably equal. The angular offset between the magnets used can also be equal and would thus be 90° in the case of a total of four magnets. However, it is also possible to use a different angular offset, in particular in a range from 60 to 120°, wherein symmetrical arrangements are preferred in which the two follower magnets on one side and the two shielding magnets on the other lie opposite one another in a mirror-like fashion with respect to a symmetry plane that includes the rotation axis. If more than two shielding magnets are used, these are preferably also arranged at equal distances from the rotation axis and distributed symmetrically around it. This creates a particularly effective shielding of the follower magnets from the Earth's magnetic field or other magnetic fields in the vicinity of the indicating device which could distort the measurement results indicated by the indicating element.

The indicating element used in the indicating device according to the invention can essentially be any indicating element already used for this purpose in the prior art. This includes both electronic and mechanical indicating devices.

In the context of the invention, the indicating element is preferably a pointer co-rotationally connected to a shaft that is rotatable about the rotation axis.

It is known from the prior art that, without countermeasures, even the slightest change in position is passed on to the indicating element during the conversion of the lifting movement into a rotational movement, which leads to extremely rapid changes in the indicated values. If a pointer is used as the indicating element, it flutters virtually continuously, which makes the reading of the measurement results very inconvenient for the user. For this reason, it has already been proposed in the prior art to stabilize the indicating element using the principle of an eddy current brake. In the case of the present invention, this principle can be implemented particularly easily. For the mounting of the individual magnets, which are preferably arranged symmetrically around the rotation axis, a magnet holder with a plate- or cup-shaped holding member can be used in accordance with the invention, said holding member having perforations in which the magnets are inserted so that one end points towards the measuring tube and the permanent magnet of the float and the other end points towards the opposite surface of the holding member. This latter surface is particularly well suited for forming the eddy current brake for the stabilization of the indicating element. To this end, a metal element is arranged at a short distance from the surface of at least one of the follower magnets and/or shielding magnets, which metal element interacts with at least one of the magnets so as to create an eddy current brake which attenuates small oscillations of the indicating element. The metal element is preferably configured in such a manner that it interacts with all magnets of the magnet holder and extends, for example, in the shape of a ring above the ends of the magnets. This ring-shaped metal element can also be integrated into a larger metal component, which is shaped as a cup or a hat and is placed over the magnet holder.

With the exception of the modifications described regarding the arrangement of the follower and shielding magnets, the variable-area flow meter according to the invention can be configured in a conventional manner known from the prior art.

BRIEF DESCRIPTION OF THE DRAWINGS

The variable-area flow meter will be explained in greater detail below with reference to the accompanying drawings. The drawings merely serve to describe a preferred embodiment of the invention without limiting the invention to this embodiment. The attached figures are purely schematic, while the same parts are designated by the same reference numbers.

The figures show.

DETAILED DESCRIPTION

Figure 1:
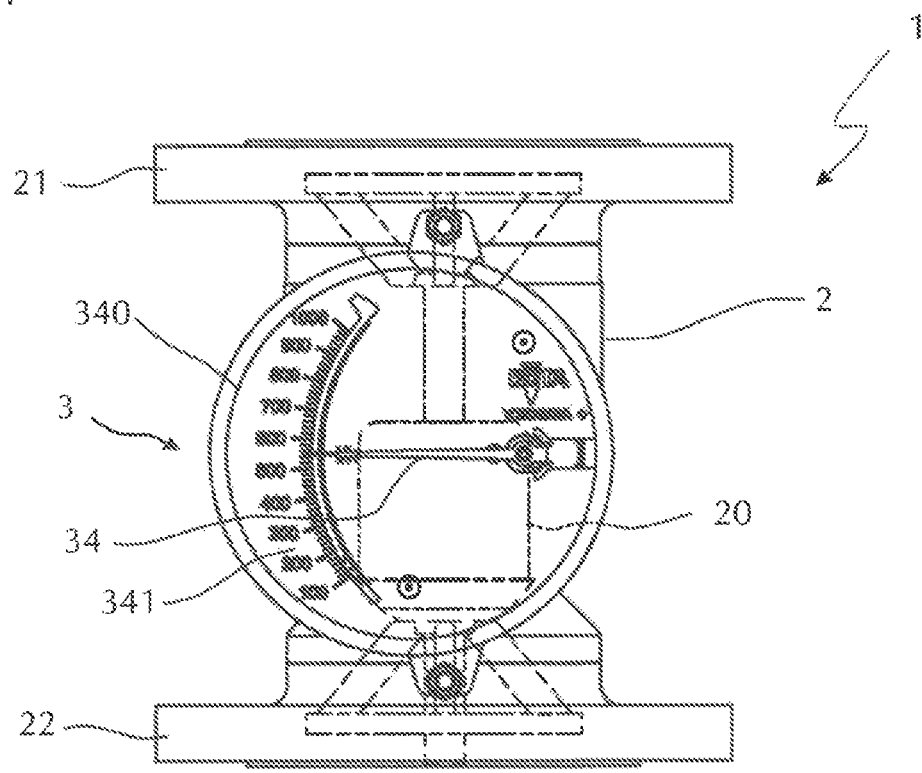
FIG. 1 is a side view of a variable-area flow meter according to the invention.
Figure 2:
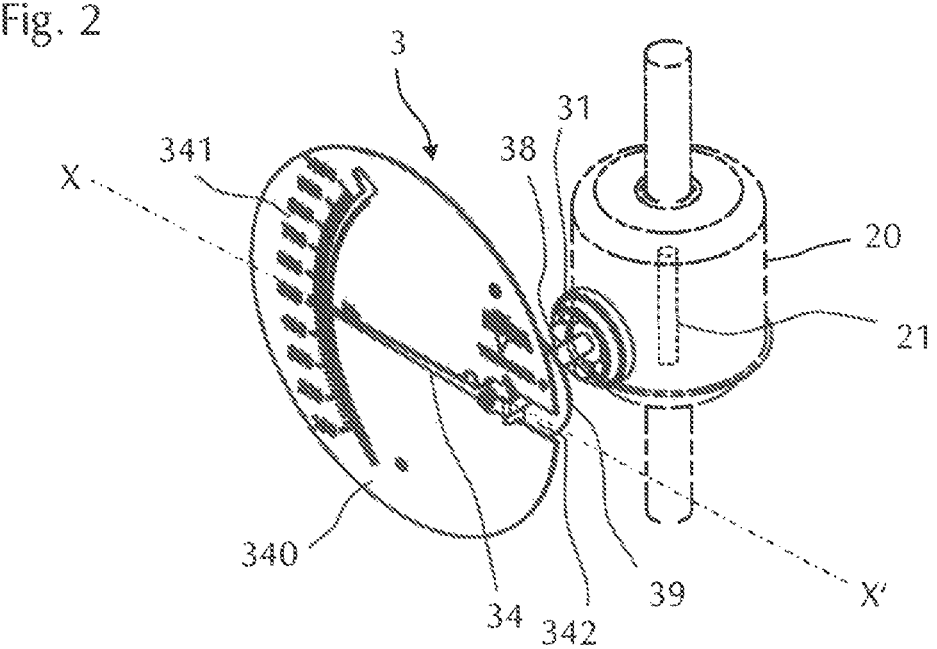
FIG. 2 is another side view of the variable-area flow meter of FIG. 1 in which the measuring tube has been omitted.

FIG. 1 depicts a variable-area flow meter 1 according to the invention with a measuring tube 2 in a side view of its indicating device 3. In this view, the variable-area flow meter according to the invention does not in principle differ from similar flow meters of the prior art. By means of the flanges 21 and 22, the measuring tube 2 is fitted into a pipe through which the fluid to be metered (a gas or a liquid) is conducted. A float 20, which is pushed, upward or downward in the figure, to a greater or lesser extent depending on the flow rate of the fluid, is arranged inside the measuring tube 2. In the indicating device 3, this linear movement of the float 20 is converted into a rotational movement that leads to a swivelling of the pointer 34. The flow rate of the fluid corresponding to the lifting movement of the float 20 can be read from the scale 341 provided on a dial 340.

Figure 3:
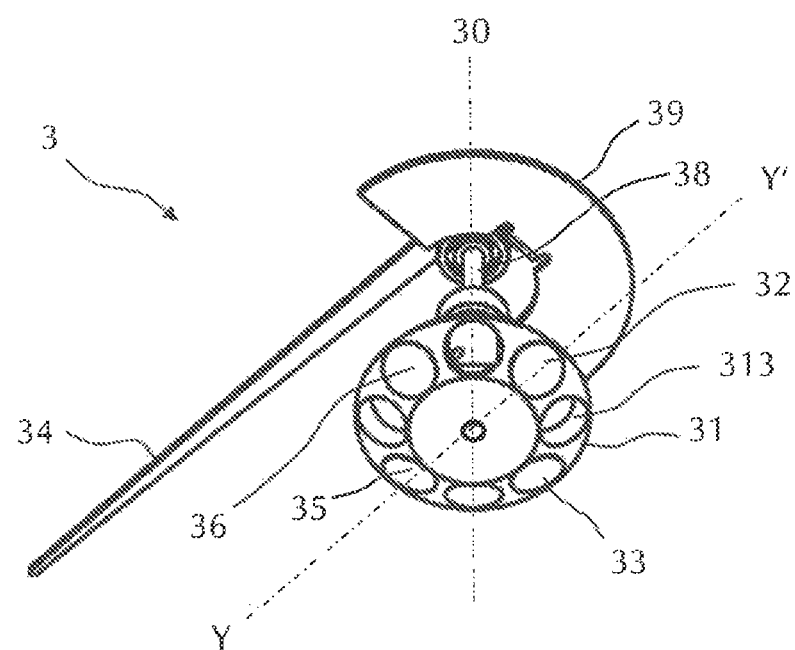
FIG. 3 is a partial view of the indicating device shown in FIGS. 1 and 2 from the measuring tube side.

In order to transmit the lifting movement of the float 20 from the measuring tube 2 to the indicating device 3, a bar-shaped permanent magnet 21, which moves up and down along with the float according to the flow rate of the fluid, is arranged inside the float in a manner known per se. The indicating device has a magnet holder 31 arranged outside the measuring tube 2 and rotatably mounted about a rotation axis 30 (FIG. 3). The rotation axis 30 is perpendicular to the lifting movement of the float 20. A shaft 38, which rotates about the rotation axis 30 together with the magnet holder, extends from the magnet holder 31 in a direction away from the measuring tube 2. At its end furthest away from the magnet holder 31, the shaft 38 supports the pointer 34, which is connected to the shaft for co-rotation. Moreover, a cover 39, which covers the gap 342 in the dial 340 through which the shaft 38 with the pointer 34 passes, extends from the upper end of the shaft 38. The pointer 34 and the cover 39 can be configured as integral or as separate parts.

Figure 5:
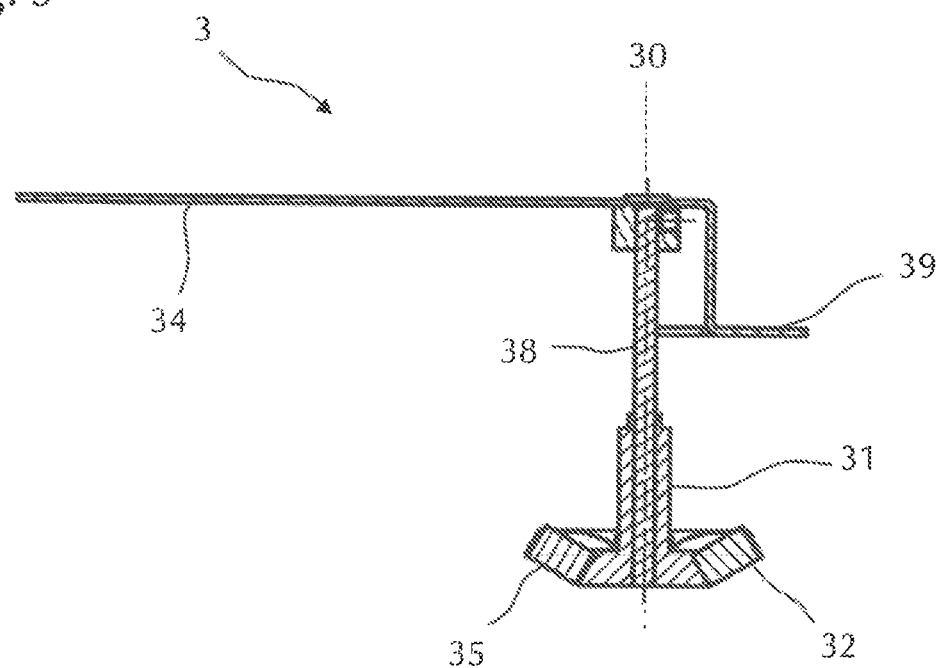
FIG. 5 is a cross-section along the line Y-Y' in FIG. 3.
Figure 6:
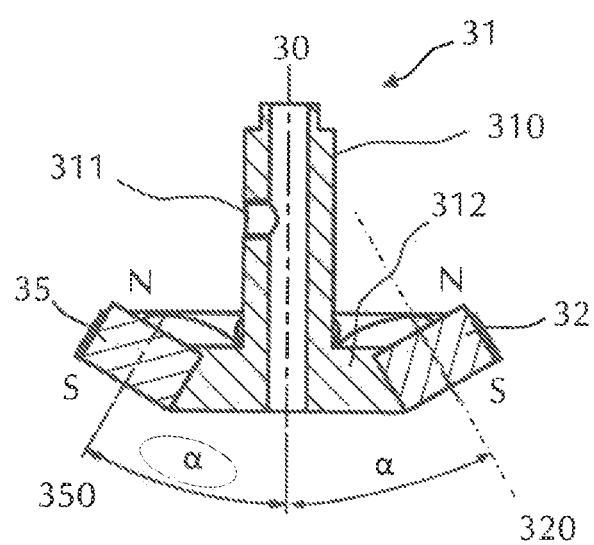
FIG. 6 is an enlarged cross-sectional depiction of the magnet holder.

The magnet holder 31 comprises a cylindrical tube 310 with a screw hole 311 (FIG. 6) so that the magnet holder 31 can be fastened to the shaft 30 with a screw. At one end of the tubular member 310, the magnet holder 31 has a plate-shaped member 312 with eight circular perforations 313. Bar-shaped permanent magnets are inserted in four of these perforations. The perforations 313 are located in the peripheral region of the plate-shaped member 312, which is positioned towards the tubular member 310. Thus, the magnets 32, 33, 35 and 36 inserted in the perforations 313 are accordingly arranged with their magnetic axes inclined towards the rotation axis 30. This is apparent for the magnets 32 and 35 in the cross-sectional depictions of FIGS. 5, 6 and 8, yet also applies to the magnets 33 and 36 in a corresponding fashion. As shown in particular in FIG. 6, the magnets 32 and 35 are arranged inside the perforations 313 in such a way that their magnetic axes 320, 350 are inclined in relation to the rotation axis 30 by an angle α. Said angle is the same for both magnets and is in a range from 5 to 70, preferably 10 to 60, more preferably 15 to 40 and especially 20 to 30°. The angle α opens towards the measuring tube 2 and is selected in such a manner that, during the transmission of the movement of the permanent magnet 21 together with the float 20 to the follower magnets in the magnet holder 31, the greatest possible linearity is obtained in the conversion of the linear lifting movement into the rotational movement of the magnet holder 31 and the shaft 38. As a result of this linear transmission of the movement into a rotational movement, the scale 341 on the dial 340 is scaled evenly with a large spread, which improves readability considerably. The specific size of the angle α to be selected depends largely on the type of magnets and the distance of the follower magnets from the permanent magnet 21.

Figure 4:
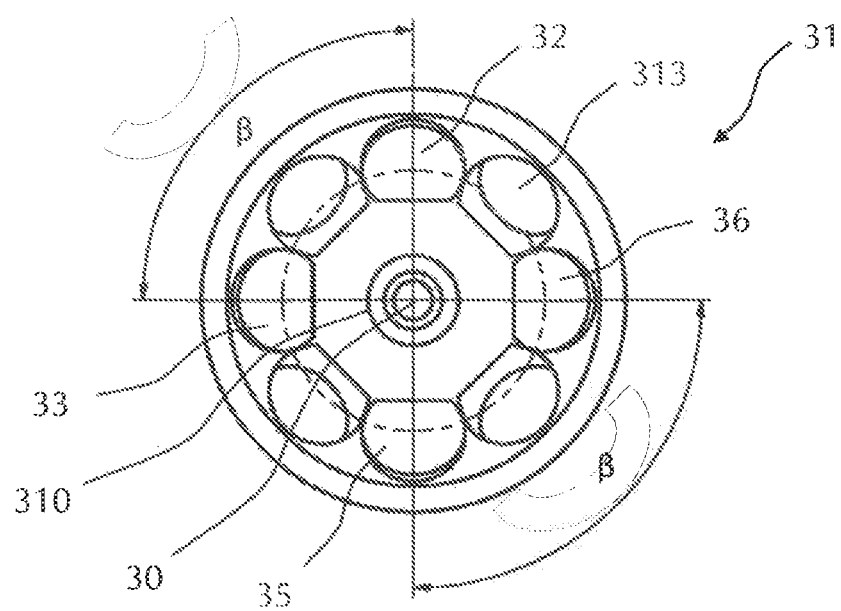
FIG. 4 is a top view of the upper side of the magnet holder of the indicating device facing away from the measuring tube.
Figure 7:
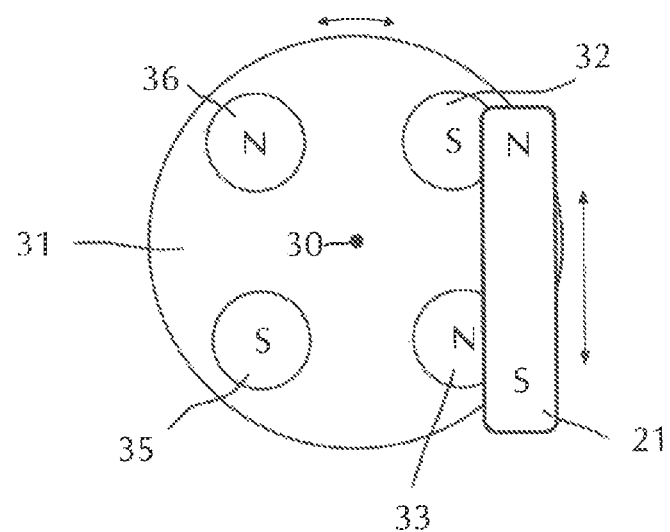
FIG. 7 is a highly schematized illustration of the bottom side of the magnet holder facing the measuring tube and its arrangement with respect to the permanent magnet of the float.

FIGS. 3, 4 and 7 best illustrate the manner in which the follower magnets and the shielding magnets are arranged in the magnet holder in the embodiment shown. The four magnets arranged inside the perforations 313 of the magnet holder 31 include two follower magnets, i.e. the magnets 32 and 33, and two shielding magnets, i.e. the magnets 35 and 36. The resulting sequence in the circumferential direction around the rotation axis 30 is "follower magnet 32, follower magnet 33, shielding magnet 35, and shielding magnet 36". The four magnets are arranged symmetrically around the rotation axis 30, i.e. they are all at the same distance from the rotation axis 30 and are arranged around the rotation axis 30 with an angular offset β of 90° (cf. FIG. 4). The latter figure shows a top view of the magnet holder onto the side with the tubular member 310.

FIG. 7 is a highly schematized depiction of the opposite side of the magnet holder 31, i.e. the side facing the measuring tube 2. All four magnets are arranged inside the perforations 313 in such a manner that one of their poles points towards the side of the magnet holder 31 with the tubular component 310 and the other points towards the side of the magnet holder oriented towards the measuring tube. This results in an alternating polarity S-N-S-N in the circumferential direction for both the side of the magnet holder pointing towards the measuring tube as well as the opposite side. For the follower magnets 32 and 33, the polarity towards the measuring tube 2 and the permanent magnet 31 is selected so that the south pole of a follower magnet, here the follower magnet 32, lies across from the north pole of the permanent magnet and, accordingly, the north pole of the second follower magnet, here the follower magnet 33, lies across from the south pole of the permanent magnet 21. The follower magnets thus follow the lifting movement of the permanent magnet 21, which is indicated by the vertical double-headed arrow in FIG. 7, and translate it into a rotational movement of the magnet holder 31 and the shaft 38 connected to it about the rotation axis 30, which is indicated by the curved double-headed arrow. This rotational movement in turn causes a deflection of the pointer 34 corresponding to the lifting movement of the float 20, which in turn corresponds to the flow rate of the fluid in the measuring tube, which is indicated on the scale 341 by the pointer 34. Due to the inclination of the magnetic axes of the magnets in the magnet holder in accordance with the invention, this conversion of the movement into a rotational movement occurs in an essentially linear manner over the entire range of the float. At the same time, the two shielding magnets 35 and 36 prevent interfering magnetic fields from influencing these processes and from distorting the measurement result.

Figure 8:
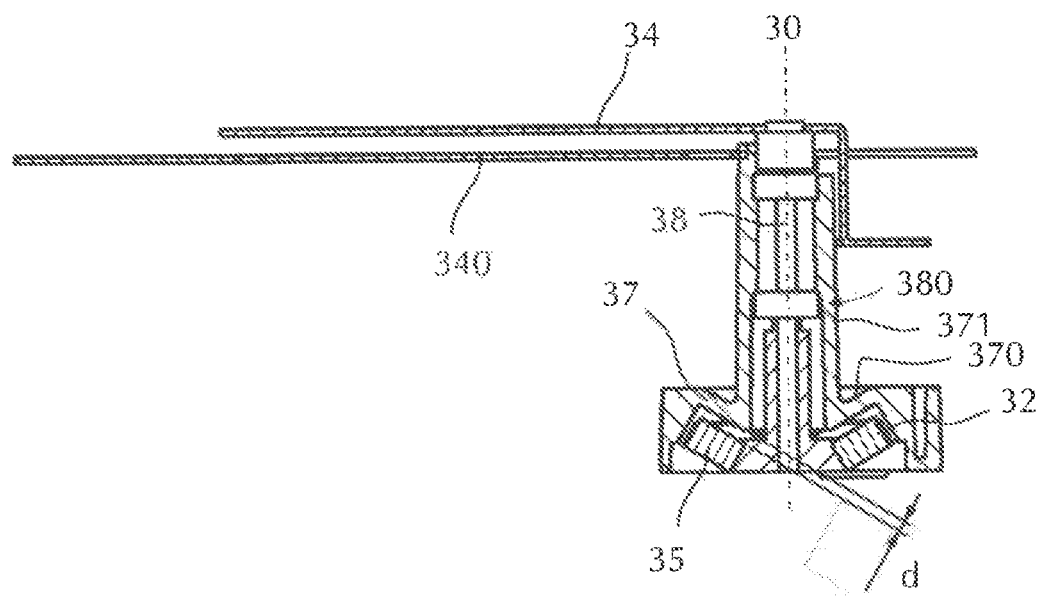
FIG. 8 is a cross-sectional depiction of the indicating device along the line X-X' of FIG. 2.

FIG. 8 shows another detail of the variable-area flow meter according to the invention. This further embodiment serves to improve the indication and prevents the pointer 34 from fluttering by using the principle of an eddy current brake. To this end, a metal element 37 is arranged on the side of the plate-shaped member of the magnet holder 31 that is oriented towards the tubular member 310. The metal element 37 has a ring-shaped region 370 extending above the magnets 32 to 36, of which only the magnets 32 and 35 are visible in the cross-sectional illustration, at a short distance d from their surfaces. The metal element 37 is configured overall as a kind of hat and is pulled over the magnet holder 31. The magnet holder 31 and the shaft 38 are mounted rotatably about the rotation axis 30 in a tubular sleeve 371 of the metal element 37 by means of a ball bearing 380, while the metal element 37 itself does not rotate. As a result, the rotational movement of the magnet holder triggered by the movement of the permanent magnet 21 generates eddy currents between the magnets 32 to 36 and the metal element 37 which inhibit the rotational movement of the magnet holder 31 about the rotation axis 30 and thus prevent the pointer 34 from fluttering at the slightest movements of the float.

Figure 9:
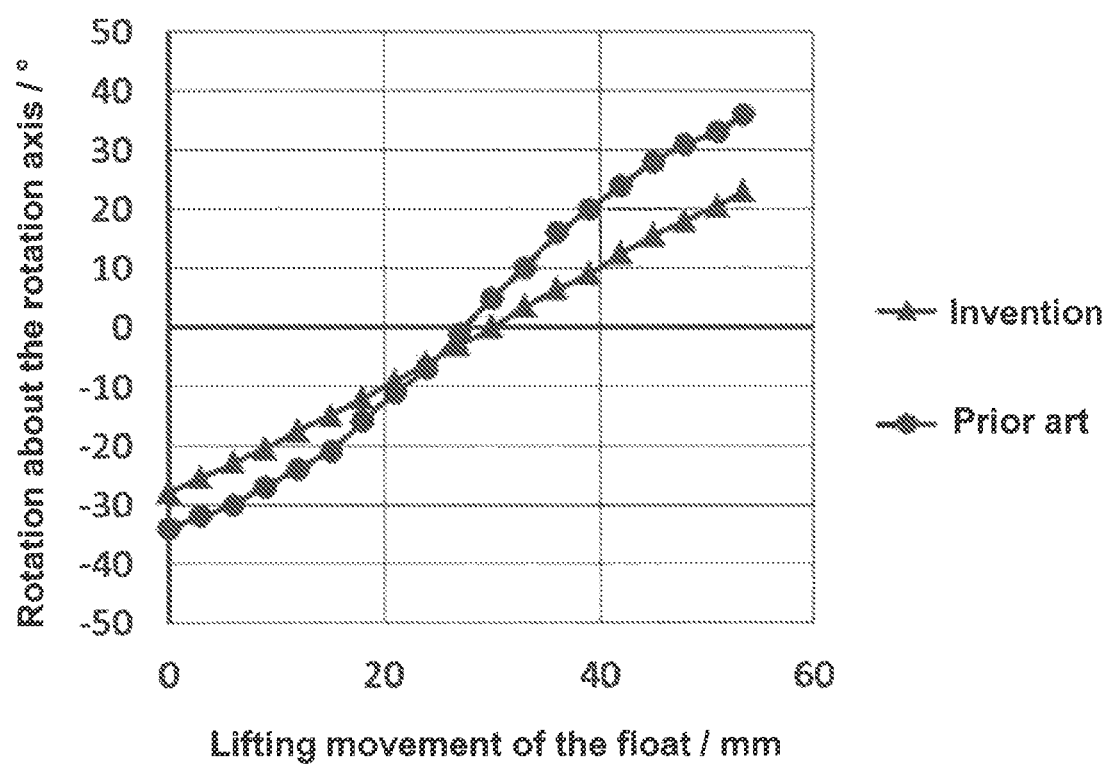
FIG. 9 is a graph showing the conversion of the lifting movement of the float into the rotational movement in the indicating device.

FIG. 9 illustrates the improved linearity of the translation of the linear lifting movement of the float into a rotational movement about the rotation axis of the magnet holder for the variable-area flow meter according to the invention in comparison with the prior art. A graphical plot of the lift of the float against the corresponding rotation angle of the magnet holder results in a curve with a significantly reduced curvature compared to the S-curves of the prior art or even in a straight line. In the case of the invention, the lifting movement of the float is thus converted into an even rotational movement that can be indicated by means of the pointer 34—or alternatively an electronic indicating element—on an evenly scaled scale with a larger spread.

What is claimed is:

1. A variable-area flow meter, comprising:
   a measuring tube, in which a float provided with at least one permanent magnet and movable by a fluid flowing through the measuring tube is arranged,
   an indicating device arranged outside the measuring tube, the indicating device comprising a magnet holder mounted rotatably about a rotation axis, the magnet holder holding at least one follower magnet that follows the movement of the permanent magnet, and
   an indicating element which reflects the movement of the at least one follower magnet, and
   wherein at least one follower magnet in the magnet holder is arranged such that a magnetic axis of the follower magnet is inclined in relation to the rotation axis by an angle ($\alpha$) not equal to 90°.

2. The variable-area flow meter according to claim 1, wherein two follower magnets are arranged in the magnet holder.

3. The variable-area flow meter according to claim 1, wherein the angle ($\alpha$) opens towards the measuring tube and is in a range from 5° to 70°.

4. The variable-area flow meter according to claim 2, wherein two further magnets are arranged in the magnet holder.

5. The variable-area flow meter according to claim 4, wherein the follower magnets and/or the further magnets are configured as bar magnets with one pole oriented towards the measuring tube and another pole oriented away from the measuring tube.

6. The variable-area flow meter according to claim 5, wherein the poles of the follower magnets that are oriented towards the measuring tube have different polarities with respect to each other and the further magnets are arranged with an inverted polarity with respect to a closest adjacent follower magnet.

7. The variable-area flow meter according to claim 4, wherein the follower magnets and the further magnets are arranged at a same distance from the rotation axis.

8. The variable-area flow meter according to claim 4, wherein the follower magnets and the further magnets are arranged around the rotation axis with an angular offset ($\beta$) of 60° to 120° in relation to one another.

9. The variable-area flow meter according to claim 1, wherein the indicating element is configured as a pointer co-rotationally connected to a shaft that is rotatable about the rotation axis.

10. The variable-area flow meter according to claim 1, wherein a metal element extends at a distance (d) from a surface of at least one of the follower magnet and/or a further magnet to form an eddy current brake for stabilization of the indicating element.

11. The variable-area flow meter according to claim 10, the metal element is configured as a cup-like component covering a surface of the magnet holder oriented away from the measuring tube.

12. The variable-area flow meter according to claim 2, wherein the two follower magnets have opposite polarity towards the measuring tube.

13. The variable-area flow meter according to claim 3, wherein the angle ($\alpha$) is in the range from 10° to 60°.

14. The variable-area flow meter according to claim 4, wherein the two further magnets follow the two follower magnets in a circumferential direction around the rotation axis.

* * * * *